US008248542B2

(12) United States Patent
Choi

(10) Patent No.: US 8,248,542 B2
(45) Date of Patent: Aug. 21, 2012

(54) TABLE TYPE LARGE-SIZE IMAGING APPARATUS

(76) Inventor: Hae-Yong Choi, Seoul (KR)

(*) Notice: Subject to any disclaimer, the term of this patent is extended or adjusted under 35 U.S.C. 154(b) by 1285 days.

(21) Appl. No.: 11/798,964

(22) Filed: May 18, 2007

(65) Prior Publication Data
US 2008/0018811 A1  Jan. 24, 2008

(30) Foreign Application Priority Data

| Jul. 21, 2006 | (KR) | 10-2006-0069698 |
| Jan. 23, 2007 | (KR) | 10-2007-0006919 |
| Mar. 19, 2007 | (KR) | 10-2007-0027454 |
| Apr. 9, 2007 | (KR) | 10-2007-0035425 |

(51) Int. Cl.
H04N 5/64 (2006.01)
H04N 5/72 (2006.01)
G03B 21/14 (2006.01)

(52) U.S. Cl. ......... 348/789; 348/744; 348/836; 353/119
(58) Field of Classification Search .................. 348/744, 348/789, 836, 839, E5.129; 353/119
See application file for complete search history.

(56) References Cited

U.S. PATENT DOCUMENTS

| 4,114,291 A * | 9/1978 | Taub | 434/261 |
| 5,285,287 A * | 2/1994 | Shikama | 348/745 |
| 7,029,128 B2 * | 4/2006 | Nishio et al. | 353/94 |
| 7,470,030 B2 * | 12/2008 | Devos et al. | 353/74 |
| 2003/0142242 A1 * | 7/2003 | Yoon et al. | 348/744 |
| 2004/0021800 A1 * | 2/2004 | Yamazaki et al. | 348/751 |
| 2004/0109145 A1 * | 6/2004 | Nishio et al. | 353/94 |
| 2005/0117075 A1 * | 6/2005 | De Vaan et al. | 348/787 |
| 2008/0239172 A1 * | 10/2008 | Choi | 348/836 |
| 2009/0207383 A1 * | 8/2009 | Hirahara et al. | 353/69 |

FOREIGN PATENT DOCUMENTS

| EP | 1818087 | | 8/2007 |
| FR | 2885423 | | 10/2006 |
| FR | 2885423 | A1 * | 11/2006 |
| JP | 63316036 | | 12/1988 |
| JP | 8062722 | | 3/1996 |
| JP | 2006171467 | | 6/2006 |
| WO | WO 97/46995 | | 12/1997 |

* cited by examiner

Primary Examiner — Mark Wendell
Assistant Examiner — Ryan Kwiecinski
(74) Attorney, Agent, or Firm — Bacon & Thomas, PLLC

(57) ABSTRACT

A table type large-size imaging apparatus in which an imaging screen and a reflector are installed in front and rear end positions of a table type case with an inclination angle that extends in directions downwardly away from the upper surface. The reflector and imaging screen are arranged to then reflect an image in a direction parallel to an upper surface of the table type case to allow a viewer to watch an image formed on the screen through a transparent window provided at a top of the table type case. The viewer's watching distance and the image projection distance are overlapped within the table type case, to achieve a maximum screen size with a minimum table size. With this configuration, a viewer who is located close to the imaging apparatus in the form of a table is able to appreciate the vivid large-size image with a downward viewing angle.

8 Claims, 9 Drawing Sheets

Fig. 2 (Prior Art)
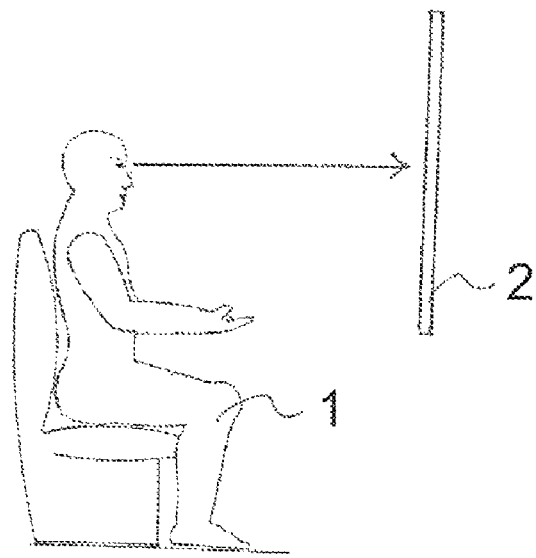
(a)
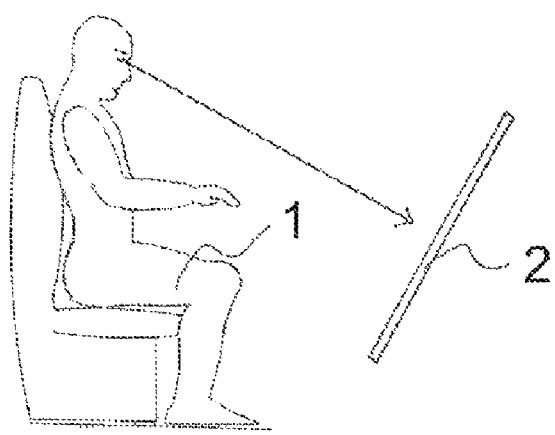
(b)

TABLE TYPE LARGE-SIZE IMAGING APPARATUS

BACKGROUND OF THE INVENTION

1. Field of the Invention

The present invention relates to an imaging apparatus for use in coffee shops, sports-bars, Internet-cafes, etc., and more particularly, to a table type large-size imaging apparatus in which a large-size imaging screen is provided within a table type case, thereby allowing people to watch sports games, enjoy movie appreciation, play electronic games, etc. in accordance with their tastes while drinking a beverage in certain places, such as coffee shops, sports-bars, etc.

2. Description of the Related Art

FIG. 1 illustrates a conventional imaging apparatus, which is used to show images to a lot of people gathered in a place. However, the conventional imaging apparatus is unsuitable for individuals who enjoy electronic games, movie appreciation, and sports games based on their different tastes.

Further, since the conventional imaging apparatus employs a personal computer monitor, or the like, it has a limit in appreciation of vivid images due to a small screen size.

Generally, in a large-size imaging apparatus using a screen, or the like, the size of the screen is in proportion to an image projection distance of a projector. Therefore, the greater the screen, it is necessary to increase the projection distance, and in turn, such an increased projection distance proportionally has a need for a wider installation area for the imaging apparatus.

Furthermore, the greater the image, a viewer's watching distance has to be increased in proportion to the size of the image, for the sake of appreciation of vivid images.

For this reason, conventionally, it has been suggested to watch the screen at a distance of at least three times that of a horizontal length of the screen.

Now, the configuration of the conventional imaging apparatus shown in FIG. 1 will be described in more detail.

If a viewer 1a is located right in front of the imaging screen 2 and thus, watches the imaging screen 2 at a short distance, a viewing angle of the viewer 1a is more than 100°. This viewing angle value largely exceeds a general viewing angle of 36° (18°×2), and thus, makes it impossible for the viewer 1a to watch the overall screen at a look. Moreover, since a screen image in the unit of a pixel is located right in front of the viewer's eyes, the viewer 1a inevitably suffers from a degradation of resolution and has a difficulty in the appreciation of vivid images.

If the imaging screen 6 shown in FIG. 1 has a diagonal length of 1 m, the viewer has to watch the screen at a remote distance of at least 3 m or more, in order to guarantee the above mentioned general viewing angle of approximately 36° required for comfortable watching of the overall screen. Under this distance condition, also, the viewer can be spaced apart from a rough screen image in the unit of a pixel, and thus, the appreciation of vivid images is possible.

In general sports-bars, coffee shops, etc., the selling of beverages is a main profit means and thus, it is important to provide a beverage supporting table in front of each viewer.

Moreover, since the greater the screen, the longer the projection distance of a projector 5, the imaging apparatus has a need for an increased floor occupation area a1 in proportion to the increased size of the imaging apparatus.

Accordingly, it will be appreciated that an imaging apparatus for forming a large-size image has a need for a large installation area, in consideration of a desired watching distance required for appreciation of vivid images, a table installation area, a projector's projection distance, etc.

However, the large installation area of the imaging apparatus may cause a reduction in the number of tables allowed to be installed in a limited area of, for example, sports-bars, coffee shops, and Internet cafes which feature expensive rental costs. Thus, the large installation area of the imaging apparatus becomes a crucial factor in reducing a business profit.

Furthermore, as shown in FIG. 2A, the conventional imaging apparatus is generally located higher than the height of the viewer's eyes. Therefore, the viewer has to watch the imaging apparatus for a long time while lifting his/her head, and this may cause the viewer to feel fatigue easily in his/her neck and shoulder.

Generally, as shown in FIG. 2B, people have the habit of downward watching and, in the view of ergonomics, the viewer has a low fatigue when watching an image with a downward viewing angle, and thus, can watch the image comfortably for a long time.

Moreover, most conventional imaging apparatuses employ a projector. However, the projector has a problem of troublesome frequent exchange of a lamp because the lifespan of the lamp is only 2,000 times or less. In addition, the lamp is generally a metal halide lamp emitting a great amount of heat, therefore using the lamp within a closed space is problematic.

SUMMARY OF THE INVENTION

Therefore, the present invention has been made in view of the above problems, and it is an object of the present invention to provide a table type large-size imaging apparatus for use in specific places using tables, such as sports-bars, coffee shops, Internet cafes, etc.

It is another object of the present invention to provide a table type large-size imaging apparatus in which an image projection distance can be overlapped within a range of the internal area of a table type case, thereby achieving a maximum screen size of more than 30 inches with a minimum image projection distance.

It is a further another object of the present invention to provide a table type large-size imagining apparatus in which a viewer's watching distance can be overlapped within a range of the internal area of a table type case, thereby allowing the viewer, who is located close to the imaging apparatus, to achieve appreciation of vivid images and enabling not only comfortable downward watching for a long time without any fatigue, but also watching of a three-dimensional image.

It is yet another object of the present invention to provide a table type large-size imaging apparatus in which a projector thereof uses a lamp having a greatly prolonged lifespan and an extremely low emission of heat, and the overall structure of a screen is improved to compensate for a deterioration in the brightness of an image projected from the projector.

BRIEF DESCRIPTION OF THE DRAWINGS

The above and other objects, features and other advantages of the present invention will be more clearly understood from the following detailed description taken in conjunction with the accompanying drawings, in which:

FIG. 2A is a diagrammatic explanatory view illustrating a conventional image viewing angle;

FIG. 2B is a diagrammatic explanatory view illustrating a downward viewing angle;

DETAILED DESCRIPTION OF THE PREFERRED EMBODIMENTS

Reference will now be made in detail to the preferred embodiments of the present invention, examples of which are illustrated in the accompanying drawings.

Figure 3:
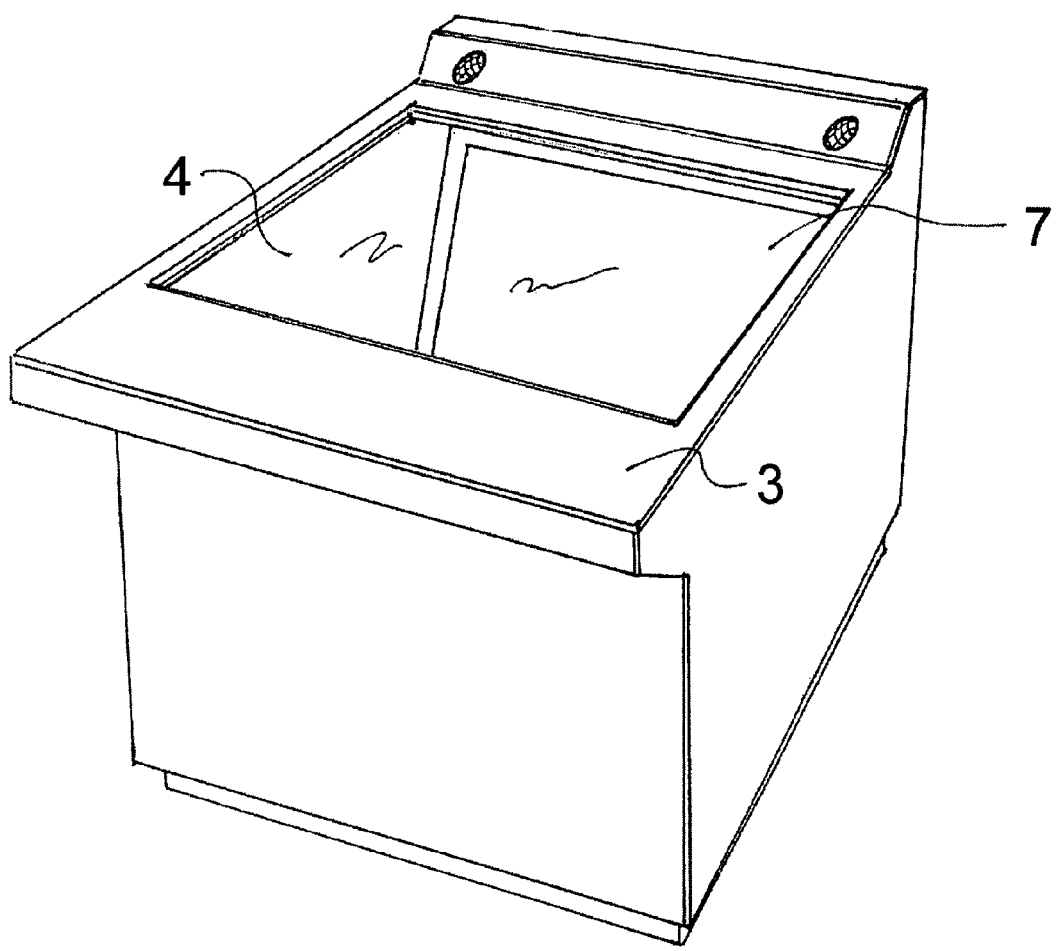
FIG. 3 is a perspective view illustrating the outer appearance of a table type imaging apparatus according to the present invention.

First, the configuration and operation of an imaging apparatus according to the present invention will be described in detail with reference to FIGS. 3 and 4.

As shown in the drawings, the imaging apparatus of the present invention includes a table type case 3 having a transparent window 4 mounted in an upper surface thereof, an imaging screen 6 installed in the table type case 3 such that it is leaned against an inner front wall of the table type case 3, and a reflector 7 installed in the table type case 3 such that it is leaned against an inner rear wall of the table type case 3, i.e., the imaging screen 6 and reflector 7 are arranged to extend downwardly away from the upper surface. Here, the terms "front" and "rear" are determined on the basis of the viewer's position, and both the imaging screen 6 and the reflector 7 are arranged, in parallel, at opposite inner walls of the table type case 3, so as to face each other with an appropriate inclination angle to reflect a projected image in a direction parallel to the upper surface. The imaging apparatus of the present invention further includes a projector 5 installed underneath the upper surface of the table type case 3 arranged to project an image downwardly at an angle away from the upper surface towards the reflector 7 and imaging screen 6.

The imaging screen 6 may be a high-reflective screen having a reflectivity of more than 4 Gains. In this case, a projection angle of the projector 5 is different from a viewing angle of a viewer 1, and thus, a reflection angle of the imaging screen 6 may be changed. If the reflection angle of the imaging screen 6 is changed, a projected image may suffer from a considerable degradation in brightness and vividness at the position of the viewer 1.

To solve the above problem, the imaging screen 6 may be formed with scattering lines or reflecting lines, 6b, in a horizontal or vertical direction, to expand a vertical viewing angle of the imaging screen 6.

Specifically, when the imaging screen 6 is a reflective screen, the scattering lines 6b are provided on a surface of the imaging screen 6, to expand a viewing angle of the imaging screen 6. On the other hand, when the imaging screen 6 is a scattering screen, the reflecting lines 6b are provided to increase a reflectivity on a reflective surface thereof. In this case, the other surface of the imaging screen 6 is provided with the scattering lines 6b, to expand the viewing angle of the imaging screen 6.

Accordingly, the reflective screen having the above mentioned scattering lines can achieve an expanded viewing angle as well as an improvement in the brightness and vividness of images.

Figure 9:
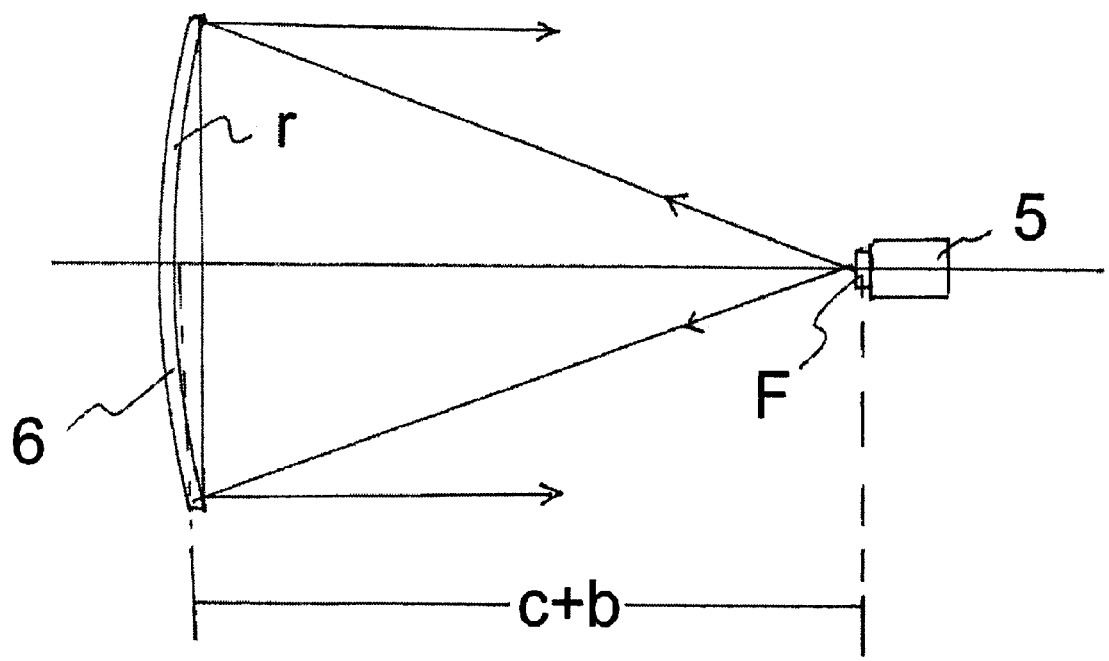
FIG. 9 is a diagrammatic explanatory view illustrating the configuration of a reflective spherical screen.

The reflective imaging screen 6, as shown in FIG. 9, may have a spherical surface and exhibit a surface reflectivity of more than 4 Gains. In this case, the projector 5 may be located at a focal position F of the imaging screen 6 corresponding to a half position of a spherical curvature r. With this configuration, it is possible to realize a high brightness more than four times of a general screen having a reflectivity of 1 Gain.

More specifically, if a distance from the imaging screen 6 to the focal position F is equal to a projection distance (c+b) that will be described hereinafter and the spherical curvature r is two times of the projection distance (c+b), the focal position F of the spherical curvature r is equal to the projection distance (c+b).

In operation of the imaging screen 6 having the above described configuration, if an image is projected from the projector 5 to the imaging screen 6 at the focal position F, the image can be straightly reflected. Thereby, a uniform and vivid image can be achieved despite a high-reflectivity surface. As a result, the reflectivity of the imaging screen 6 can be raised up to 20 Gains. Therefore, the imaging screen 6 can guarantee an enhancement in brightness up to four to twenty times of a general screen even when using a small projector that has a semiconductor light source, such as a light emitting diode (LED), laser diode, etc. and thus, has a relatively low brightness.

In an embodiment of the present invention, there may be provided two projectors 5. In this case, a pair of polarizing films are mounted at front ends of projection lenses of the respective projectors 5 such that the polarizing films have symmetrical leftward and rightward polarizing directions. With this configuration, the watching of a three-dimensional image is possible.

Of the two projectors 5, one projector 5 is adapted to receive an image captured from the left side of an object, and the other projector 5 is adapted to receive an image captured from the right side of the object. Then, if both the projectors 5 project both the images, i.e. a left-eye image and right-eye image, onto the screen 6 simultaneously, the viewer 1 can watch a three-dimensional image. Of course, for the watching of the three-dimensional image, the viewer has to wear polarizing glasses capable of polarizing both the left-eye image and the right-eye image in symmetrical leftward and rightward directions.

In the present invention, both the imaging screen 6 and the reflector 7 are installed to have an inclination angle suitable for achieving a desired reflectivity. For example, as seen in FIG. 4, the imaging screen 6 and reflector 7 extend downwardly away from the upper surface so that the image projected by the projector 5 is reflected by the imaging screen or reflector in a direction parallel to the upper surface. Accordingly, if an image is formed on the imaging screen 6 installed in the front end position of the table type case 3, the viewer 1 is able to watch the image through the transparent window 4 as the image is reflected by the reflector 7 provided at the rear end position of the table type case 3.

Specifically, if the projector 5 projects an image, the image is first reflected by the reflector 7 to thereby be formed on the imaging screen 6 located in front of the reflector 7. Then, the image is again reflected by the reflector 7, thus allowing the viewer 1 to watch the image formed on the imaging screen 6.

In this case, the watching distance of the viewer 1 is the sum of a distance (a) from the viewer's eyes to the reflector 7 by way of the transparent window 4 and a distance (b) from the reflector 7 to the imaging screen 6. That is, the watching distance of the viewer 1 is equal to the distance sum (a+b).

Also, the projection distance of the projector 5 is the sum of a distance (c) from the projector 5 to the reflector 7 and the distance (b) from the reflector 7 to the imaging screen 6. That is, the projection distance of the projector 5 is the distance sum (c+b).

Figure 4:
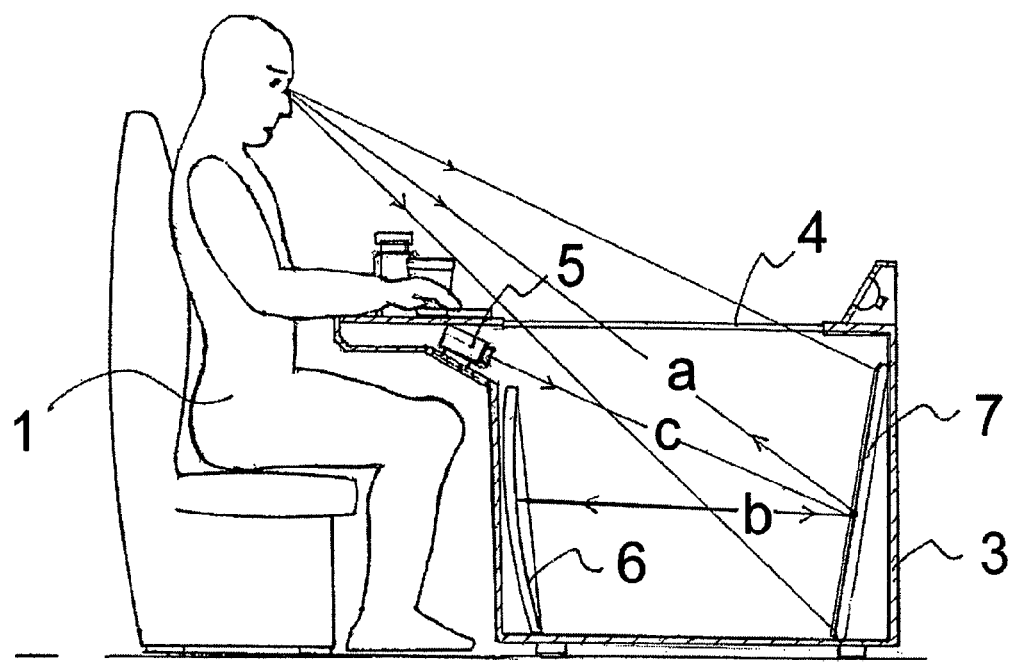
FIG. 4 is a diagrammatic explanatory view illustrating the configuration of the imaging apparatus according to a first embodiment of the present invention.
Figure 5:
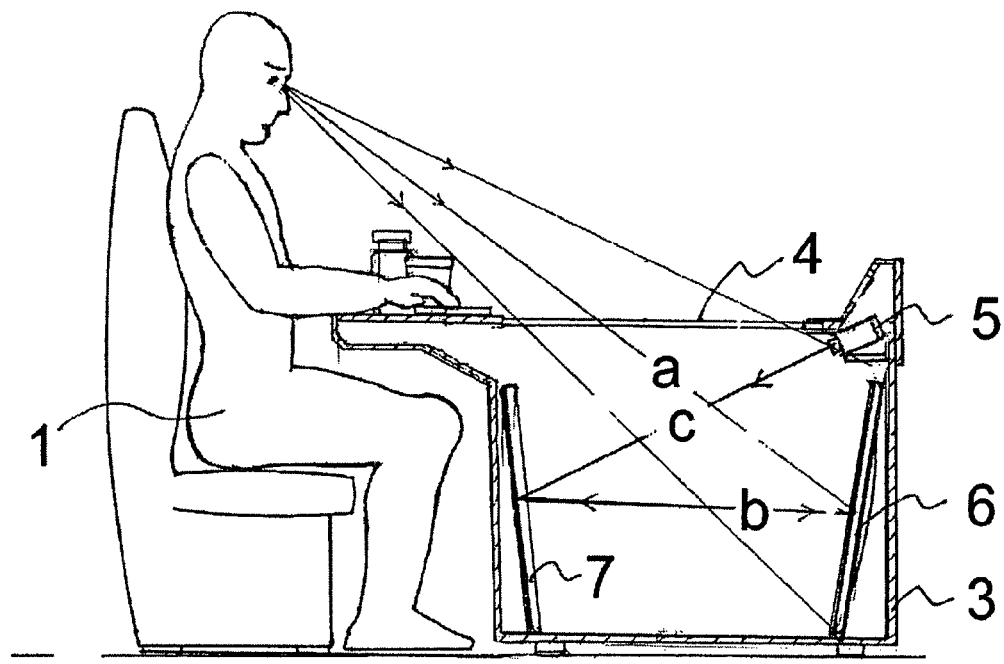
FIG. 5 is a diagrammatic explanatory view illustrating the configuration of the imaging apparatus according to a second embodiment of the present invention.

More specifically, the table type case 3 shown in FIG. 4 for use in the present invention generally has a length of not more than 1 m.

In this case, the distance (c) and the distance (b), which constitute the projection distance of the projector 5, are overlapped with each other within the table type case 3 by way of the reflector 7. Accordingly, the projection distance (c+b) may be at least 2 m.

Assuming that the projection distance of the projector 5 is 2 m, generally, it is possible to realize a screen size of 40 inches (1 m).

In turn, assuming that the screen size is 40 inches, the watching distance (a+b) of the viewer may be approximately 3 m.

Accordingly, with the above described configuration of the present invention, the viewer who is located right in front of the table type case 3 can feel like as he/she watches a screen at a remote distance of more than three times of the screen size.

The above described maximum watching distance and projection distance can be accomplished because the distances (a, b, and c), which constitute the watching distance (a+b) of the viewer 1 and the projection distance. (c+b) of the projector 5, are overlapped with each other within a range of the internal area of the table type case 3 as the watching distance and the projection distance are refracted, respectively, by the reflector 7.

In the present invention, although the watching distance of the viewer 1 may be slightly reduced by changing positions of the imaging screen 6, projector 5, and reflector 7, the watching distance can be overlapped with the length of the table type case 3, and this has the effect of reducing the occupation area of the imaging apparatus. Further, since the projection distance of the projector 5 is the sum of the distance (b) and the distance (c), it is possible to achieve the projection distance of more than two times of the length of the table type case 3 within a range of the internal area of the table type case 3.

Figure 6:
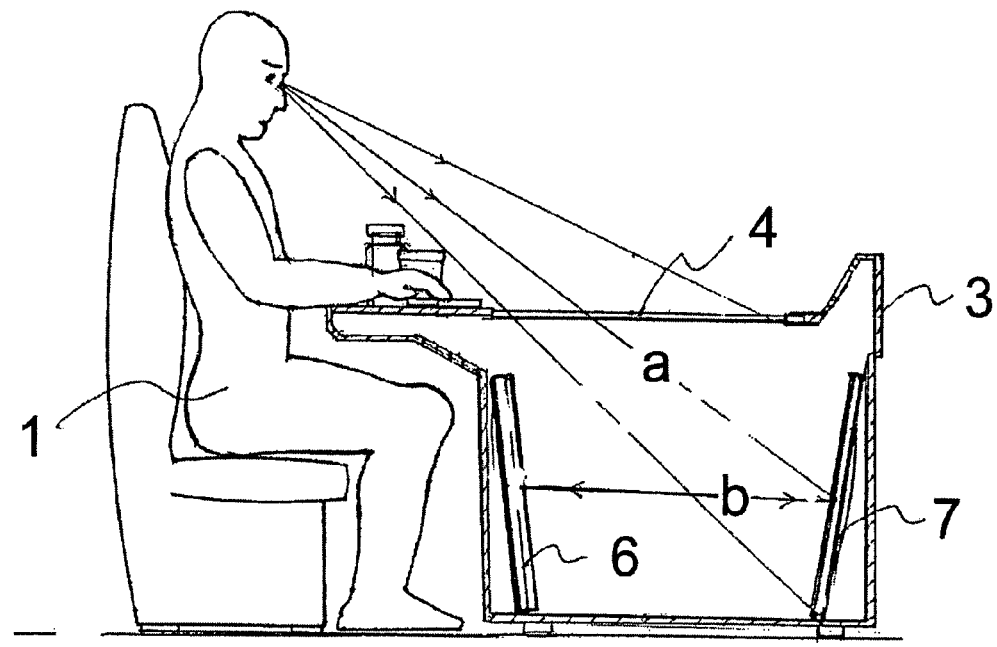
FIG. 6 is a diagrammatic explanatory view illustrating the configuration of the imaging apparatus according to a third embodiment of the present invention.
Figure 7:
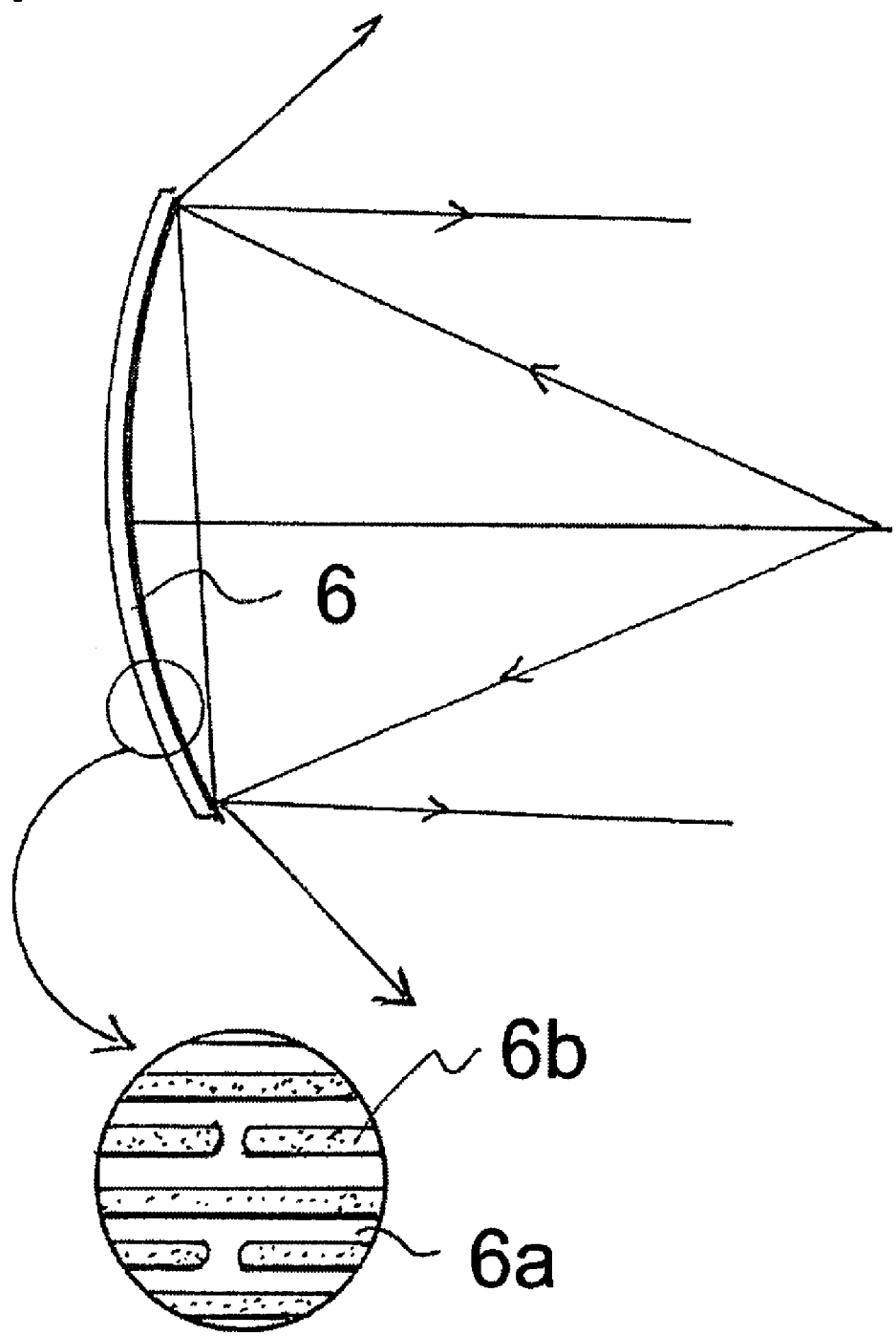
FIG. 7 is a diagrammatic explanatory view illustrating a vertical viewing angle of an imaging screen.

As shown in FIG. 6, in an alternative embodiment of the present invention, the imaging screen 6 may take the form of a flat-plane screen, such as a plasma display panel (PDP) or liquid crystal display (LCD) and no projector 5 is provided. Even in the alternative embodiment, the watching distance (a+b) of the viewer 1 has no variation, and thus, the same remote-distance watching effect as that of the above description can be accomplished.

Moreover, when the projector 5 is a small-size projector using a semiconductor light source such as an LED or diode laser, the semiconductor light source has a prolonged lifespan as long as three to ten times of the lifespan of a general lamp, and thus, has the effect of reducing troublesome frequent exchange of the lamp in consideration of the fact that the imaging apparatus of the present invention is mainly used in places of business. In particular, the semiconductor light source, such as an LED and diode laser, has a reduction in the emission of heat as small as one tenth of a conventional lamp.

Accordingly, it can be said that the semiconductor light source is very useful for use in a closed space employed in the present invention.

As known, most conventional projectors used in places of business have an inconvenience of frequent exchange because a lamp thereof has a relatively short lifespan and suffers from emission of excessive heat nevertheless of being used in a closed space.

To eliminate the above problems of the prior art, the present invention proposes to use a projector using the above described semiconductor light source although the projector causes a relatively low brightness of images. The low brightness problem of the projector can be sufficiently overcame by the above described reflective screen of the present invention.

Hereinafter, several effects of the present invention will be described in detail with reference to FIGS. 8A and 8B.

Figure 1:
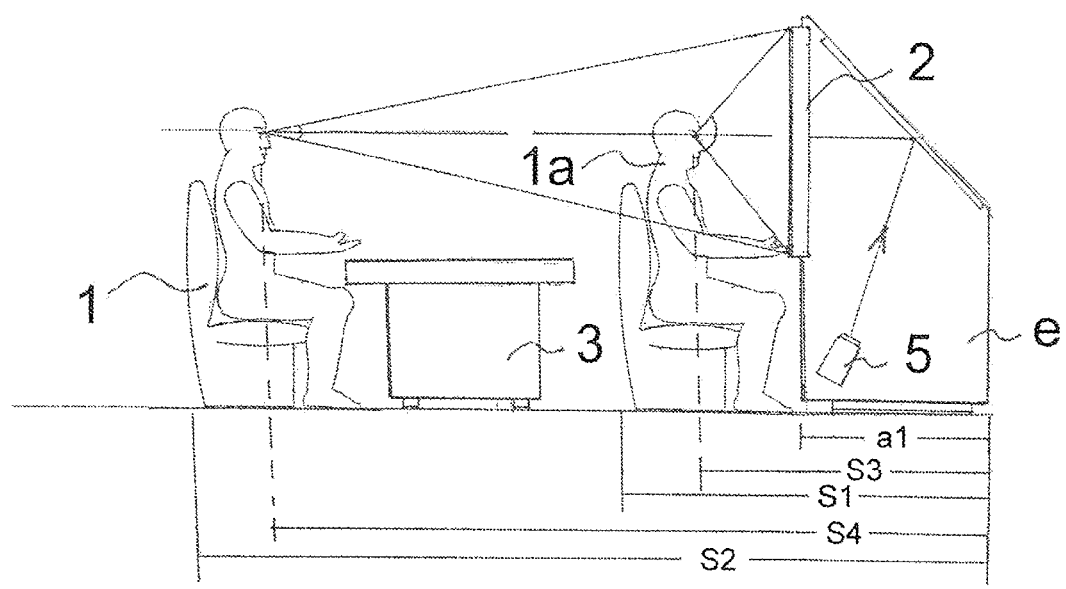
FIG. 1 is a diagrammatic explanatory view of a conventional imaging apparatus.
Figure 8:
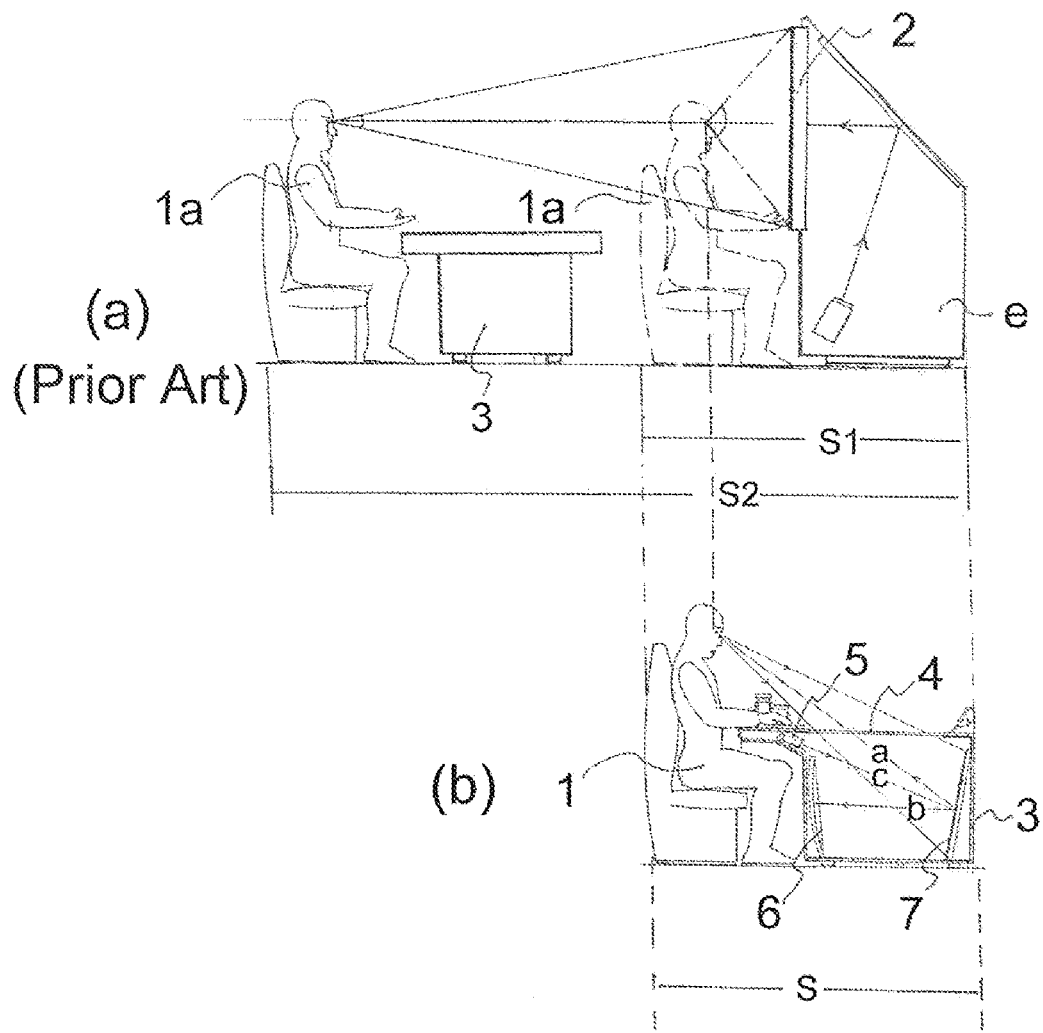
FIGS. 8A and 8B are comparative views of imaging structures of the prior art and the present invention.

FIG. 8A illustrates the conventional imaging apparatus as shown in FIG. 1, and FIG. 8B illustrates the imaging apparatus of the present invention as shown in FIG. 4. That is to say, FIGS. 8A and 8B are comparative views of the prior art and the present invention.

The occupation area (s1), which has an occupation viewing area (s3), of the box type conventional imaging apparatus (e) is equal to an occupation area (s) of the table type imaging apparatus according to the present invention.

In the case of the box type conventional imaging apparatus (e), the imaging screen 2 is inevitably positioned higher than the viewer's eyes, to achieve a predetermined projection distance.

On the other hand, in the present invention, the projection distance (c+b) is dually overlapped within the table type case 3, and this enables comfortable downward watching for the viewer.

Further, the conventional imaging screen shown in FIG. 8A requires for the viewer 1 to watch the screen at a remote distance of more than three times of the screen size. Consequently, the conventional imaging apparatus occupies a very large installation area.

In the present invention as shown in FIG. 8B, even if the viewer is located right in front of the table type case 3, the viewer can achieve the watching distance (a+b) equal to three times of the screen size and thus, appreciation of vivid images and watching of the overall screen are possible. Furthermore, as compared to the occupation area of the conventional imaging apparatus, the imaging apparatus of the present invention has an occupation area (s) of 1/2~2/5 times of the conventional occupation area (s2), which has an occupation viewing area (s4). This means that an increased number of imaging apparatuses of more than 2~2.5 times that of the conventional imaging apparatuses can be installed within the same installation area of a shop, resulting in a profit increase of 2~2.5 times of the shop.

In the high-reflective imaging screen 6 of the present invention, the reflective lines or scattering lines are formed vertically or horizontally on the screen 6 for the purpose of expanding a vertical viewing angle. As a result, the brightness of the screen 6 can be increased to more than 4 Gains exceeding the conventional brightness of 1~2 Gains. This enables appreciation of vivid images having a brightness of more than two times as compared to the prior art, therefore the use of the projector having the semiconductor light source such as an LED, laser diode, etc. is possible.

Also, in association with the image projection distance that is in proportion to the size of the imaging apparatus, the present invention can achieve a projection distance of more than two times that of the prior art as a result of overlapping the projection distance within the table type case 3 by use of the reflector 7. As a result, it is possible to realize a large-size screen of 2~4 times that of the prior art.

Although the conventional imaging apparatus is separately provided with a table, in the present invention, the imaging screen is mounted in the table such that the table constitutes a part of the imaging apparatus enabling the watching of a three-dimensional image.

Consequently, the present invention can achieve, as compared to the prior art, a reduced occupation area of 1/2~2/5 times, an increased watching distance of more than three times, and a large-size screen of more than two times. Moreover, the present invention enables appreciation of vivid images having a brightness of more than two times of the prior art while guaranteeing a comfortable downward watching for the viewer. Accordingly, the imaging apparatus of the present invention can be efficiently used in specific places, such as sports-bars, coffee shops, Internet-cafes, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A table type large-size imaging apparatus comprising:
    a table type case having a first end, a second end on an opposite side of said first end, an upper surface, and a transparent window formed in said upper surface;
    at least one projector installed in the table type case beneath said upper surface projecting an image downwardly at an angle away from the upper surface towards a reflector or an imaging screen; and
    said reflector installed towards the first end and said imaging screen installed towards the second end of said case beneath said upper surface,
    said reflector and imaging screen both arranged to extend in directions downwardly away from the upper surface and facing towards each other at an inclination angle in a manner such that the reflector receives the image projected on the reflector or the imaging screen by the projector, and
    wherein the reflector and imaging screen are arranged to receive, reflect, or form the image projected from the at least one projector by reflecting the image from the reflector or imaging screen in a direction parallel to the upper surface, said image being viewable on said reflector or imaging screen through said transparent window from above the table.

2. The table type large-size imaging apparatus according to claim 1, wherein the imaging screen is a reflective screen having a scattering line formed at a surface of the reflective screen for expanding a vertical viewing angle of the screen.

3. The table type large-size imaging apparatus according to claim 1, wherein the projector includes a semiconductor light source selected from the group consisting of a light emitting diode (LED) and a laser diode.

4. The table type large-size imaging apparatus according to claim 1, wherein the imaging screen has a spherical surface and a surface reflectivity of 4 Gains or more.

5. The table type large-size imaging apparatus according to claim 1, wherein the at least one projector includes two projectors arranged to project a left-eye image and a right-eye image on the imaging screen having projecting lenses and polarizing films mounted in front of the projection lenses to enable viewing of the images.

6. The table type large-size imaging apparatus according to claim 1, wherein the imaging screen and reflector are arranged to reflect a projected image so that a viewing distance is at least two times a screen size of the imaging screen by increasing a projection distance of the image projected from the at least one projector.

7. A table type large-size imaging apparatus comprising:
    a table type case having a first end, a second end on an opposite side of said first end, an upper surface, and a transparent window formed in said upper surface;
    a reflector installed at the first end and an imaging screen installed at the second end within the table type case,
    wherein the imaging screen is a flat-plane screen;
    said reflector and imaging screen arranged to extend in directions downwardly away from the upper surface and facing towards each other at an inclined angle in a manner such that the reflector receives an image displayed on the imaging screen, and
    wherein the reflector and imaging screen are arranged to receive, reflect, or form the image by reflecting the image from the reflector or imaging screen in a direction parallel to the upper surface on the imaging screen or reflector to be viewed through the transparent window from above the table.

8. The table type large-size imaging apparatus according to claim 7, wherein the flat-plane screen is selected from the group consisting of a plasma display panel (PDP) and a liquid crystal display (LCD).

* * * * *